United States Patent
Kuttenberger et al.

(10) Patent No.: US 8,558,732 B2
(45) Date of Patent: Oct. 15, 2013

(54) DEVICE FOR DETERMINING A RELATIVE SPEED BETWEEN A VEHICLE AND AN IMPACT OBJECT

(75) Inventors: Alfred Kuttenberger, Herrenberg (DE); Marc Theisen, Besigheim (DE); Michael Bunse, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 1528 days.

(21) Appl. No.: 10/558,078

(22) PCT Filed: Mar. 17, 2004

(86) PCT No.: PCT/DE2004/000534
§ 371 (c)(1),
(2), (4) Date: Aug. 22, 2006

(87) PCT Pub. No.: WO2004/110822
PCT Pub. Date: Dec. 23, 2004

(65) Prior Publication Data
US 2007/0035113 A1   Feb. 15, 2007

(30) Foreign Application Priority Data
May 23, 2003  (DE) .................................. 103 23 483

(51) Int. Cl.
*G01S 13/00* (2006.01)
(52) U.S. Cl.
USPC ........................................... 342/70; 342/109
(58) Field of Classification Search
USPC .......................................................... 342/70
See application file for complete search history.

(56) References Cited

U.S. PATENT DOCUMENTS

| | | | |
|---|---|---|---|
| 5,126,978 A * | 6/1992 | Chaum | 367/135 |
| 5,780,985 A * | 7/1998 | Bickley et al. | 318/460 |
| 6,271,747 B1* | 8/2001 | Fendt et al. | 340/436 |
| 6,408,237 B1* | 6/2002 | Cho | 701/45 |
| 6,434,506 B1* | 8/2002 | Eckersten et al. | 702/142 |
| 2002/0078930 A1* | 6/2002 | Minowa et al. | 123/478 |
| 2002/0152802 A1* | 10/2002 | Gysling et al. | 73/61.79 |
| 2002/0169537 A1* | 11/2002 | Regensburger et al. | 701/96 |
| 2003/0051530 A1* | 3/2003 | Eisele et al. | 73/12.09 |
| 2004/0030476 A1* | 2/2004 | Oswald et al. | 701/45 |
| 2004/0100626 A1* | 5/2004 | Gulden et al. | 356/28.5 |

FOREIGN PATENT DOCUMENTS

| | | | | |
|---|---|---|---|---|
| DE | 198 17 334 | | 8/1999 | |
| DE | 199 57 187 | | 5/2001 | |
| DE | 19957187 | | 5/2001 | |
| DE | 10039422 A1 * | | 2/2002 | G01P 3/36 |
| DE | 101 40 119 | | 3/2003 | |
| DE | 101 41 886 | | 3/2003 | |
| DE | 10140119 | | 3/2003 | |
| DE | 10141886 | | 3/2003 | |
| EP | 0 950 583 | | 10/1999 | |
| EP | 0950583 | | 10/1999 | |

* cited by examiner

*Primary Examiner* — Timothy A Brainard
(74) *Attorney, Agent, or Firm* — Kenyon & Kenyon LLP

(57) ABSTRACT

A device is proposed for determining a relative speed between a vehicle and a crash object, the device being situated in the vehicle itself. The device has one active surround field sensor system and one contact sensor system. The device ascertains the relative speed with the aid of a first signal, the surround field sensor system and with the aid of a second signal of the contact sensor system.

20 Claims, 2 Drawing Sheets

DEVICE FOR DETERMINING A RELATIVE SPEED BETWEEN A VEHICLE AND AN IMPACT OBJECT

FIELD OF THE INVENTION

The present invention relates to a device for determining a relative speed between a vehicle and a crash object.

BACKGROUND INFORMATION

A method is known from German Patent No. 198 17 334 for adjusting a triggering threshold of passenger protective devices. In this context, the triggering threshold is lowered as a function of the pre-crash signal and a crash signal. A fiber optic loading sensor is proposed as the crash sensor, which is provided at at least one crash surface typical for accident situations, and, when a force acts upon the light fiber system, it leads to a change in the light output that is to be measured at the light exit by a light meter, as a function of which the crash signal is sent. The crash signal is logically linked to the pre-crash signal, for instance, in an AND gate, in order to make possible the lowering of the triggering threshold, which comes about based on the signal of the acceleration sensor.

SUMMARY OF THE INVENTION

Compared to this, the device according to the present invention for determining a relative speed between the vehicle and a crash object has the advantage that, at this point, the relative speed between the crash object and the vehicle is not determined only using the signals of the pre-crash sensor, but also using the signal of a contact sensor. Especially in the last phase of an accident, considerable braking processes may occur, so that the relative speed, which the pre-crash sensor by itself has determined, might represent an overestimate. This is corrected by the signal of the contact sensor, by also now drawing upon this signal for determining the relative speed. The surround field sensor system or pre-crash sensor system may be configured using various surround field sensor types. By the determination of the relative speed, one may then provide an appropriate use of means of restraint or actuator technology in general, since the relative speed decidedly determines the severity of the accident. Especially when an ultrasound sensor is used as the surround field sensor, one is able to extend the speed range by the contact sensor. But even in the case of radar sensors, such as when using so-called long-range radar sensors (e.g. at 77 GHz), especially at low speeds, by braking or accelerating in the range of 0 to 2 meters in front of the vehicle, great changes in the speed measured by the radar sensor may come about. Because of this uncertainty of the aforesaid crash speed, the information concerning the approaching speed may be used only to a very limited degree for controlling the triggering of irreversible means of restraint.

The exact contact point in time may be determined with the aid of the contact sensor system. If there is a relevant difference between the impact point in time predicted by the radar sensor and that measured by the contact sensor, one may conclude from this that the object has accelerated or braked in the range in which the radar sensor is blind. From the difference between the estimated and the measured impact point in time, the speed estimate may then be corrected, and air bag triggering or seat belt tensioner triggering may be optimized while using the crash speed. In this context, it may also be correspondingly provided that the triggering thresholds for the means of restraint are altered. But even a change in the triggering signal is possible in this situation. In the case of the combination of ultrasound sensors with a contact sensor, the situation is different. For example, at this time, the upper measuring limit for a speed measurement, only using ultrasound sensors, is about 40 km/h. If an object is moving faster towards the vehicle, it is possible that the ultrasound sensor is not able to record enough measuring points for calculating a speed. If, for instance, based on high speed or low sensor quality of the ultrasound sensors, only 2 or 3 distance points from the object are known, the speed may be calculated from the distance information and the contact point in time that was measured by the contact sensor. This is then used in the air bag triggering algorithm. Consequently, speed information for higher speeds, such as for ranges above 40 km/h, may be obtained, at which the ultrasound sensor by itself is no longer able to supply sound data.

A combination of the radar sensor, the ultrasound sensor and the contact sensor may also be installed in the vehicle. The combination also leads to a broadening of the recording range. In addition, the passing on of the object from one sensor system to the next may also be managed, whereby, for instance, the plausibilization of the object is made easier. Using the information, both the triggering of the means of restraint and the activation of reversible means of restraint may be improved. Additionally, the information of the surround field sensor system may be utilized to improve pedestrian sensing. This is possible, for example, by the preparation of pedestrian detection or by introducing exclusionary criteria when, for example, the speed of the object is greater than that of a pedestrian.

It is especially advantageous that the contact sensor system has a piezo cable that is situated at the outer skin of the vehicle. Such a piezo cable is able to react as a contact sensor to a crash, capacitively, piezoelectrically and by resistance change upon stretching of the cable. It thus inherently offers various measuring principles and consequently leads to a very reliable contact sensor. Alternatively, switches are also a possibility, as are contact decks that are pressed together during the crash, so that thereby contact with a crash object is detected with great certainty. However, other contact sensors are also a possibility. In this connection, we might mention, for instance, acceleration-based sensors installed in the front of the vehicle. These may be upfront sensors, which are calibrated to be more sensitive than the usual crash sensors.

Furthermore, it is advantageous that the surround field sensor system may include not only an ultrasound sensor or a radar sensor, but also a PMD sensor (photomixer device). In the case of this sensor, a sensor illuminates the surroundings with light, and the receiver measures the running time, so as thereby to calculate a three-dimensional image.

DETAILED DESCRIPTION

Radar sensors and ultrasound sensors as surround field sensor technology were developed especially for convenience functions such as automatic cruise control or parking aid. But such surround field sensors have also been proposed as pre-crash sensors. In the field of pedestrian protection, contact sensors are currently being developed.

According to the present invention, the determination of the relative speed to the crash point in time is ascertained by a combination of signals of a surround field sensor system and a contact sensor system. A long-range radar (LRR), for instance at 77 GHz, or an ultrasound sensor system may especially be used as a surround field sensor system, and, for instance, a piezo cable or a switch may be used as contact sensor. However, other contact sensors are also known. Advantageously, by using the contact sensor, the detection range for the determination of the relative speed is extended. Using a radar sensor, an ultrasound sensor and a contact sensor ensures continuous tracking of the crash object. At the same time, the contact sensor is used as a plausibility sensor. All in all, the device according to the present invention leads to increased safety of the vehicle occupants.

Figure 1:
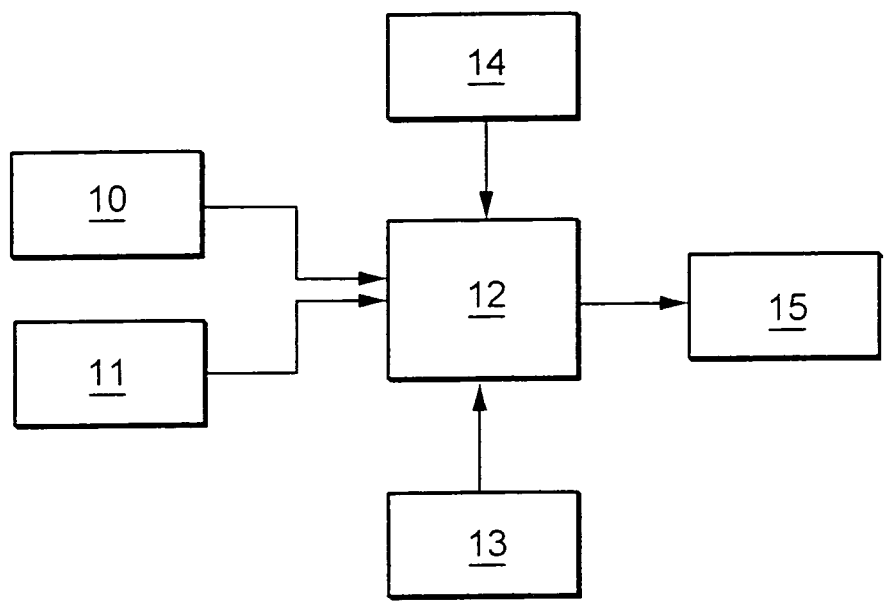
FIG. 1 shows a block diagram of the device according to the present invention.

FIG. 1 shows the device according to the present invention in a block diagram. A surround field sensor system 10 and a contact sensor system 11 are each connected to a control unit 12 for activating means of restraint. The surround field sensor system 10 is situated at the front of the vehicle, as is also contact sensor system 11. However, it is possible to position surround field sensor system 10 and contact sensor system 11 at other places of the outer skin of the vehicle, in addition or instead. Surround field sensor system 10, in this case, has a radar sensor system which emits radar waves at 77 GHz. Such a radar sensor is particularly suitable for remote monitoring. In this case, for example, contact sensor system 11 has a piezo cable that is situated in the bumper of the vehicle, and is an inherently reliable sensor in case of a crash because it uses a capacitive measurement, a piezoelectric measurement and a resistance measurement. In addition, surround field sensor system 10 may have an ultrasound sensor system. It is also possible that surround field sensor system 10 has only an ultrasound sensor system instead of the radar sensor. The measuring signals of surround field sensor system 10 are amplified and digitized and possibly preprocessed, for instance, so as already to determine the relative speed. This signal is then transmitted to control unit 12. Contact sensor system 11 also supplies a contact signal to control unit 12 as a digital signal. It may be that sensors 10 and 11 are connected to a bus, and are connected to control unit 12 in that fashion. In this connection, a wireless transmission of the data between sensors 10 and 11 and control unit 12 is also possible.

Control unit 12 uses the relative speed that surround field sensor system 10 has determined, or it determines from the measured data of surround field sensor system 10 itself the relative speed between the vehicle and the crash object. The signal of contact sensor 11 uses control unit 12 to correct the determination of the relative speed. The relative speed is then used to select means of restraint, or it goes into the triggering algorithm in order, for example, to change the threshold that determines the triggering of the means of restraint, or even the signal which is compared to the triggering thresholds. Using this concept, one may intensify or weaken the air bag triggering algorithm, as a function of the relative speed.

However, control unit 12 does not control the means of restraint only as a function of the signals of pre-crash sensor system 10 and contact sensor system 11, but also and particularly as a function of a crash sensor system 13, which principally has acceleration sensors. The acceleration sensors give additional information on the seriousness of the crash and the crash sequence. The acceleration sensors may be distributed in the vehicle, for instance, at the front of the vehicle as upfront sensors and in the sides, for instance, in the B column of the vehicle and also in control unit 12 itself. The acceleration sensor have different sensitivity axes, in order to detect acceleration in the various spatial directions. Rollover processes may also be detected in such a way, it being then possible also to use a rotation rate sensor or an angle of rotation sensor. A kinematic sensor platform may, in this connection, also supply the necessary data. However, other crash sensors, such as a pressure sensor for sensing a side crash, are also possible.

Control unit 12 is furthermore connected to a passenger compartment sensor system 14. Passenger compartment sensor system 14, for instance, a video monitoring or a weight sensing, gives information about the number and type of passengers. Using passenger compartment sensor system 14, it is particularly possible to distinguish between an object and a person. Using this sensor system, then, only those means of restraint are activated which are really protecting a person. As a function of all these signals, control unit 12, which has a processor for evaluating these signals, then activates means of restraint 15. Means of restraint 15, in this situation, are either connected to control unit 12 via a point-to-point connection, or via a bus. When it comes to means of restraint 15, air bags are principally involved, which include the driver's air bag, the front passenger air bag, knee air bags, and window air bags, but also rollover bars and belt tensioners, and also, particularly, reversible belt tensioners and seat actuators, in order to improve the seating position of the passenger for the crash.

Figure 2:
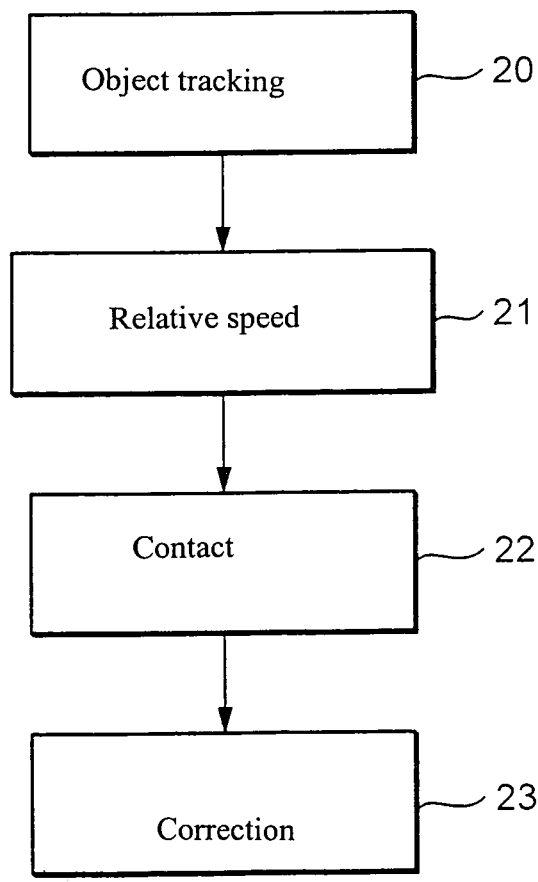
FIG. 2 shows a flow chart.

In FIG. 2, a second flow chart is depicted which illustrates the function of the device according to the present invention. In method step 20, the crash object is tracked using surround field sensor system 10. Using that, and, to be sure, using the data of accident sensor system 10, the relative speed of this object to the vehicle is determined in method step 21. If there is a contact, that is, if there is a crash of the object with the vehicle, this is recorded in method step 22, with the aid of contact sensor system 11. The signal of the contact sensor is used for correcting the relative speed in method step 23. The relative speed thus corrected may then be used in the triggering algorithm for determining the triggering time. The relative speed may also be used for selecting the means of restraint, since, in a light crash, the use of air bags is not necessarily indicated. In this connection, the use of belt tensioners may be sufficient.

Figure 3:
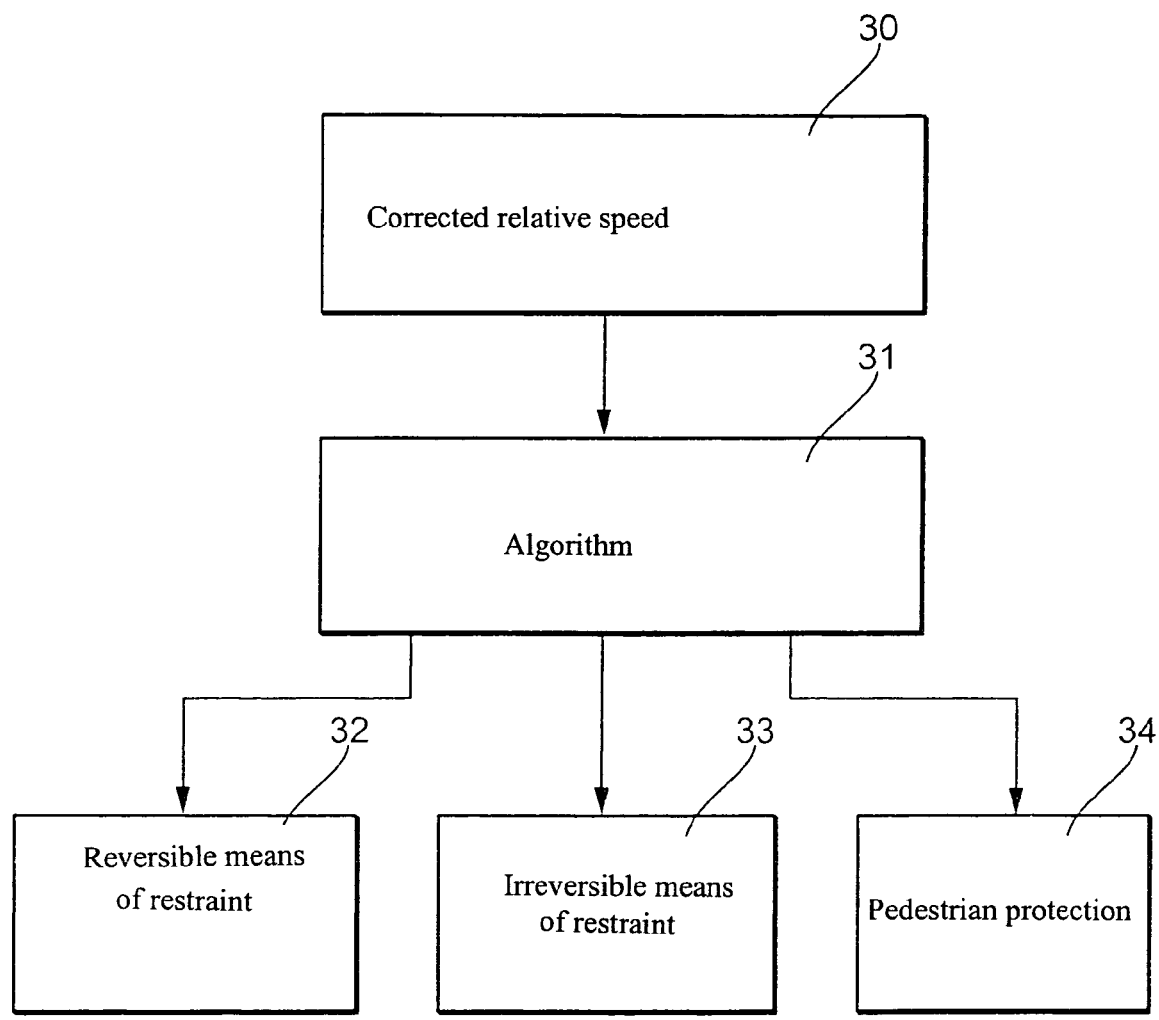
FIG. 3 shows a second flow chart.

In one additional flow chart, FIG. 3 shows what may be done with the corrected relative speed. The corrected relative speed is made available in method step 30. This is supplied, in method step 31, to the algorithm which controls the triggering of the means of restraint. The relative speed may be drawn upon, for instance, as a parameter for the seriousness of the accident. It may also be drawn upon to change the triggering thresholds or to modify the triggering signal, so that triggering takes place more rapidly or slower. Furthermore, the relative speed may be used for selecting the means of restraint that are to be triggered. Therefore, algorithm 31 is able to activate reversible means of restraint 32, irreversible means of restraint 33 and a pedestrian protection 34.

What is claimed is:

1. A device for being situated in a vehicle and for determining a relative speed between the vehicle and a crash object, comprising:
   at least one active pre-crash surround field sensor system;
   at least one contact sensor system;
   an arrangement for ascertaining the relative speed based on a first signal of the at least one surround field sensor system and based on a second signal from the at least one contact sensor system, wherein the signal of the contact sensor system is used to correct the relative speed of the pre-crash surround field sensor system.

2. The device as recited in claim 1, wherein the at least one active surround field sensor system includes a radar sensor system.

3. The device as recited in claim 2, wherein the radar sensor system generates a measuring signal at 77 GHz.

4. The device as recited in claim 1, wherein the at least one active surround field sensor system includes a lidar sensor system.

5. The device as recited in claim 1, wherein the at least one active surround field sensor system includes a video sensor system.

6. The device as recited in claim 1, wherein the at least one active surround field sensor system includes an ultrasound sensor system.

7. The device as recited in claim 1, wherein the at least one active surround field sensor system includes a PMD sensor system.

8. The device as recited in claim 1, wherein the at least one contact sensor system includes a piezo cable that is situated at an outer skin of the vehicle.

9. The device as recited in claim 1, wherein the at least one contact sensor system includes an optical sensor.

10. The device as recited in claim 1, wherein the at least one contact sensor system includes an acceleration sensor.

11. The device as recited in claim 1, wherein the at least one contact sensor system includes at least one switch.

12. The device as recited in claim 1, further comprising:
an arrangement for coupling to an actuator system in such a way that the relative speed is used in activating the actuator system.

13. The device as recited in claim 12, wherein the actuator system includes a reversible restraint arrangement.

14. The device as recited in claim 12, wherein the actuator system includes an arrangement for providing a pedestrian protection.

15. The device as recited in claim 1, further comprising:
an arrangement for coupling to an actuator system in such a way that the relative speed is used in activating the actuator system;
wherein the at least one active surround field sensor system includes a radar sensor system, wherein the radar sensor system generates a measuring signal at 77 GHz.

16. The device as recited in claim 15, wherein the actuator system includes a reversible restraint arrangement.

17. The device as recited in claim 15, wherein the actuator system includes an arrangement for providing a pedestrian protection.

18. The device as recited in claim 1, further comprising:
an arrangement for coupling to an actuator system in such a way that the relative speed is used in activating the actuator system;
wherein the at least one contact sensor system includes a piezo cable that is situated at an outer skin of the vehicle, wherein the at least one contact sensor system includes at least one of an acceleration sensor and an optical sensor, wherein the at least one contact sensor system includes at least one switch.

19. The device as recited in claim 1, further comprising:
an arrangement for coupling to an actuator system in such a way that the relative speed is used in activating the actuator system;
wherein the at least one contact sensor system includes a piezo cable that is situated at an outer skin of the vehicle, wherein the at least one contact sensor system includes at least one of an acceleration sensor and an optical sensor, wherein the at least one contact sensor system includes at least one switch, and wherein the actuator system includes a reversible restraint arrangement.

20. The device as recited in claim 1, wherein:
the crash object is tracked using the surround field sensor system,
the relative speed of this object to the vehicle is determined using the surround field sensor system and data of an accident sensor system,
if there is a contact because of a crash of the object with the vehicle, the contact is recorded with the aid of the contact sensor system,
the signal of the contact sensor is used to correct the relative speed so that the corrected relative speed is used in a triggering algorithm for determining a triggering time,
the corrected relative speed is used as a parameter for a seriousness of the accident, and to change triggering thresholds and to modify a triggering signal, so that the triggering takes place more rapidly or slower, and
the corrected relative speed is used to select the restraint that is to be triggered, an algorithm being used to activate at least one of a reversible restraint, an irreversible restraint and a pedestrian protection.

* * * * *

UNITED STATES PATENT AND TRADEMARK OFFICE
CERTIFICATE OF CORRECTION

PATENT NO.       : 8,558,732 B2                                     Page 1 of 1
APPLICATION NO. : 10/558078
DATED            : October 15, 2013
INVENTOR(S)      : Kuttenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1702 days.

Signed and Sealed this
Fifteenth Day of September, 2015

Michelle K. Lee
*Director of the United States Patent and Trademark Office*